(12) United States Patent
Chou et al.

(10) Patent No.: US 11,082,449 B2
(45) Date of Patent: Aug. 3, 2021

(54) REMOTE MEMORY DIAGNOSTICS

(71) Applicant: Cypress Semiconductor Corporation, San Jose, CA (US)

(72) Inventors: Wen-Ching Chou, Sunnyvale, CA (US); Sandeep Krishnegowda, San Jose, CA (US); Qamrul Hasan, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/829,219

(22) Filed: Mar. 25, 2020

(65) Prior Publication Data

US 2021/0126946 A1   Apr. 29, 2021

Related U.S. Application Data

(60) Provisional application No. 62/925,645, filed on Oct. 24, 2019.

(51) Int. Cl.
*H04L 29/06* (2006.01)
*G06F 21/72* (2013.01)
*H04L 9/30* (2006.01)
*H04L 9/32* (2006.01)

(52) U.S. Cl.
CPC ............ *H04L 63/166* (2013.01); *G06F 21/72* (2013.01); *H04L 9/3073* (2013.01); *H04L 9/3242* (2013.01); *H04L 63/0428* (2013.01)

(58) Field of Classification Search
CPC . H04L 63/166; H04L 63/0428; H04L 9/3073; H04L 9/3242; G06F 21/72
See application file for complete search history.

(56) References Cited

U.S. PATENT DOCUMENTS

| | | | |
|---|---|---|---|
| 6,654,355 B1 * | 11/2003 | Marbach | H04L 12/4135 370/285 |
| 7,593,344 B2 | 9/2009 | Jordan et al. | |
| 8,806,106 B2 | 8/2014 | Goss et al. | |
| 9,665,469 B2 | 5/2017 | Christopher et al. | |
| 10,140,109 B2 * | 11/2018 | Tobolski | H04L 67/34 |
| 10,191,799 B2 | 1/2019 | Karlik et al. | |

(Continued)

OTHER PUBLICATIONS

"CloudIQ Detailed Review: A Proactive Monitoring and Analytics Application for Dell EMC Storage Systems," Dell Inc., Jun. 1, 2019, pp. 1-63; 63 pages.

(Continued)

*Primary Examiner* — Paul E Callahan (57) ABSTRACT

Disclosed are systems and methods for diagnosing the health of a plurality of memory cells in a memory array. Diagnostics are initiated from a remote server via an encrypted channel on the memory device embedded in an end-use system. The memory device includes a plurality of memory cells in a memory array. At the remote server, encrypted diagnostics data is received in response to execution of a diagnostics program by the memory device on the plurality of memory cells. The diagnostics data pertains to the health of the memory cells. The encrypted diagnostics data is decrypted into decrypted diagnostics data and the decrypted diagnostics data is analyzed to determine the health of the memory cells. Failure mitigation is performed for the memory device if the analyzing indicates unhealthy memory cells.

21 Claims, 9 Drawing Sheets

(56) References Cited

U.S. PATENT DOCUMENTS

| | | |
|---|---|---|
| 10,268,553 B2 | 4/2019 | Eggert et al. |
| 10,324,648 B1 | 6/2019 | Goss et al. |
| 10,346,232 B2 | 7/2019 | Shulkin et al. |
| 10,354,736 B1 | 7/2019 | Yang et al. |
| 10,475,519 B2 | 11/2019 | Parry et al. |
| 2007/0078929 A1* | 4/2007 | Beverly ............... H04L 12/66 709/204 |
| 2013/0185563 A1* | 7/2013 | Djabarov ............ G06F 9/441 713/176 |
| 2016/0162375 A1 | 6/2016 | Kim |
| 2016/0378352 A1* | 12/2016 | Khan ................ G06F 3/0679 711/103 |
| 2018/0278588 A1* | 9/2018 | Cela ................ H04L 63/0485 |
| 2019/0026171 A1 | 1/2019 | Lea et al. |
| 2019/0108888 A1 | 4/2019 | Sarkar et al. |
| 2019/0340136 A1 | 11/2019 | Irwin et al. |

OTHER PUBLICATIONS

Cai, Yu, "Errors in Flash-Memory-Based Solid-State Drives: Analysis, Mitigation, and Recovery," Cornell University, Jan. 5, 2018, pp. 1-86; 86 pages.

CloudIQ Detailed Review: A Proactive Monitoring and Analytics Application for Dell EMC Storage Systems, Dell Inc Jun. 1, 2019, pp. 1-63, entire document.

International Search Report for International Application No. PCT/US2020/56967 dated Dec. 3, 2020; 3 pages.

Written Opinion of the International Searching Authority, for International Application No. PCT/US20/56967 dated Dec. 30, 2020; 70 pages.

* cited by examiner

REMOTE MEMORY DIAGNOSTICS

CROSS-REFERENCE TO RELATED APPLICATIONS

This application claims the benefit of prior application U.S. Provisional Application No. 62/925,645, filed 24 Oct. 2019, which application is herein incorporated by reference in its entirety for all purposes.

TECHNICAL FIELD OF THE INVENTION

The invention generally relates to the field of diagnosing memory array devices. More particularly the present disclosure relates to securely and remotely detecting problems in cells of the memory devices prior to failure of such devices.

BACKGROUND

Figure 1:
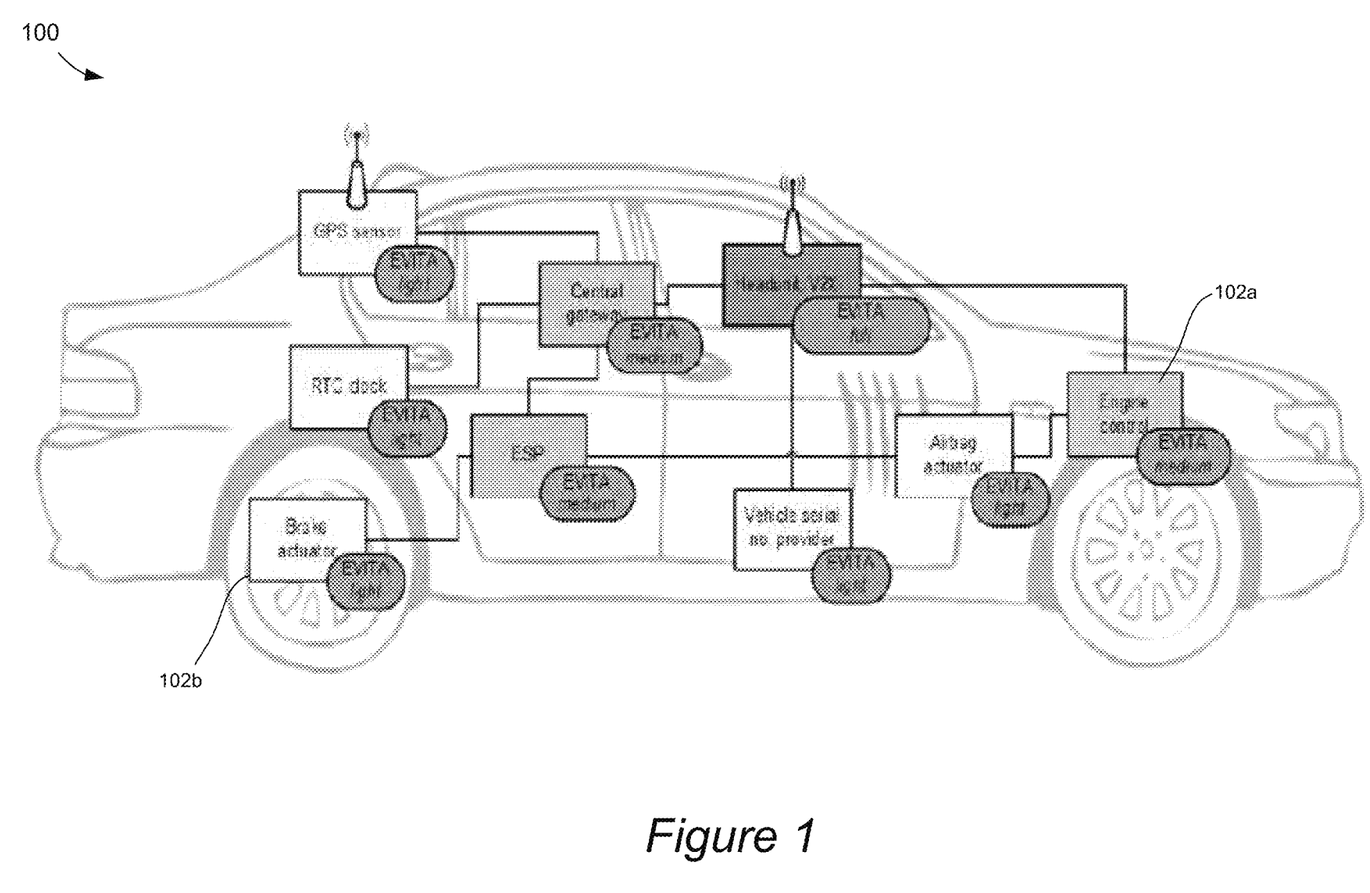
FIG. 1 is a diagrammatic representation of an automobile system in which memory device integrated circuits may be implemented.

Generally, nonvolatile memory devices, such as NOR Flash devices, or other memory device types can be integrated into various end-use systems, such as an automobile system. FIG. 1 is a diagrammatic representation of an automobile system 100 in which memory device integrated circuits may be implemented. For example, the car may include an engine control system 102a and brake actuator system 102b that are controllable by an onboard memory device system that forms part of an integrated circuit (IC).

In this automobile system application and other applications, functional safety for automotive driving requires increased reliability in the memory array of such storage components. However, errors are currently detected only after a system failure. Specifically, a memory unit (e.g., Customer Corrective Action Request (CCAR) unit), which includes the failing memory device, is removed from its automobile system and an in-house test program is executed in Automatic Test Equipment (ATE) for debugging the failure of memory device. The ATE debugging is typically controlled by the memory device manufacturer, or a trusted 3$^{rd}$ party, to maintain security of the memory device's code, e.g., to prevent hacking of such code. Since the memory's data can only be accessed in a secure environment to implement diagnostics, a failing memory unit is collected from the OEM's (original equipment manufacturer) end-product system (e.g., automobile); received into the ATE, which then puts the unit into test mode. A test program is then run one the memory device to collect data, which is then analyzed to diagnose the failure.

Unfortunately, this technique and setup increases failure analysis and takes a significant amount of time for physically removing and shipping the memory unit. Additionally, corrective actions cannot be proactively performed before failure to avoid such failure. If a catastrophic failure occurs such as corrupted code, the manufacturer may also issue a recall of each memory device that has been integrated into the end-product system. This recall may be associated with significant costs.

In view of the foregoing, there is a current demand for improved systems and techniques for diagnosing issues in memory array devices prior to a failure event so that corrective action can be performed prior to failure.

SUMMARY

The following presents a simplified summary of the disclosure in order to provide a basic understanding of certain embodiments of the disclosure. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

Methods and systems for diagnosing the health of a memory device are disclosed. In one embodiment, diagnostics are initiated from a remote server via an encrypted channel on the memory device embedded in an end-use system. The memory device includes a plurality of memory cells in a memory array. At the remote server, encrypted diagnostics data is received in response to execution of a diagnostics program by the memory device on the plurality of memory cells. The diagnostics data pertains to the health of the memory cells.

In one aspect, the encrypted diagnostics data is decrypted into decrypted diagnostics data, and the decrypted diagnostics data is analyzed to determine the health of the memory cells. In a further aspect, failure mitigation is performed for the memory device if the analyzing indicates unhealthy memory cells. In another aspect, an authentication function is performed on the decrypted or encrypted diagnostic program by the memory device prior to execution, and the authentication function is a hashed message authentication code (HMAC).

In a specific implementation, initiating diagnostics comprises sending from the remote server an encrypted diagnostics program to the memory device, which is configured to decrypt such encrypted diagnostics program prior to execution of the diagnostics program. In one aspect, encryption of the encrypted diagnostics program was performed by the remote server prior to sending to the memory device. In another aspect, encryption of the encrypted diagnostics program is based on a public encryption key that is paired with a private encryption key provisioned at the memory device for decrypting the encrypted diagnostics program received by the memory device.

In another embodiment, initiating diagnostics further comprises sending by the remote server a test mode command for instructing the memory device to switch to test mode prior to sending the encrypted diagnostics program to the memory device. In this aspect, a TCP/IP header is appended to the encrypted diagnostics program prior to sending to the memory device, and the TCP/IP header is replaced with a bus protocol header by a bridge driver device prior to being received by the memory device. In another embodiment, the test mode command is in the form of a secure protocol that is implemented by the memory device. In one example, the secure protocol is a Transport Layer Secure (TLS) protocol.

In another embodiment, the invention pertains to at least one non-transitory computer readable storage medium having computer program instructions stored thereon that are arranged to perform any combination of the above described methods.

In an alternative embodiment, the invention pertains to an integrated circuit (IC) system comprising a memory array having a plurality of memory cells, a crypto subsystem for performing encryption and decryption, and a processor, coupled with the memory array and crypto subsystem. The processor is configured to receive encrypted diagnostic data from the crypto subsystem and communicate such encrypted diagnostic data to a remote server while the IC is embedded in an end-user system. The encrypted diagnostic data pertains to the health of the memory cells of the memory array. In one embodiment, the memory array comprises nonvolatile memory.

In a specific embodiment, the processor is further configured to receive an encrypted diagnostic program from the remote server, communicate the encrypted diagnostic program to the crypto subsystem for decryption into a decrypted diagnostic program, and execute the decrypted diagnostic program on the memory array to obtain diagnostic data that is communicated to the crypto subsystem for encryption into the encrypted diagnostic data.

In yet another embodiment, the IC includes additional memory for storing an authentication code for the encrypted or decrypted diagnostic program, and the processor is further configured to perform an authentication operation on the encrypted or decrypted diagnostic program using the authentication code and executing the decrypted diagnostic program only when authentication passes. In another aspect, the additional memory is also configured to store an authentication key, and the authentication operation comprises a hashed message authentication code (HMAC) performed on the encrypted or decrypted diagnostic program and further based on the authentication key.

In a specific implementation, the IC also includes a one-time programmable memory system for storing a private encryption key, and the decryption of the encrypted diagnostic program is based on the private encryption key. In this aspect, the decrypted diagnostic program was encrypted by the remote server into the encrypted diagnostic program using a public encryption key paired with such private encryption key.

These and other aspects of the invention are described further below with reference to the figures.

DETAILED DESCRIPTION OF EXAMPLE EMBODIMENTS

In the following description, numerous specific details are set forth in order to provide a thorough understanding of the present invention. The present disclosure may be practiced without some of these specific details. In other instances, well known process operations have not been described in detail to not unnecessarily obscure the present invention. While the invention will be described in conjunction with the specific embodiments, it will be understood that it is not intended to limit the invention to the embodiments.

In general, embodiments of the present disclosure pertain to any type of memory array device for which diagnostics are to be securely performed to diagnose and prevent problems in such memory array. Nonvolatile memory (NVM) devices generally encompass integrated circuit devices that include at least one nonvolatile memory module, such as a programmable memory array. NVM devices can include the following device types: PROM (programmable read-only memory), EPROM (erasable PROM), EEPROM (electrically-erasable PROM), Flash memory (such as the Semper Secure NOR Flash device by Cypress Semiconductor Corp. of San Jose, Calif., eMMC (embedded multi-media card), MRAM (magneto-resistive random-access memory), FeRAM (ferroelectric RAM), NVRAM (nonvolatile RAM), and MCU (microcontroller unit). NVM devices are typically programmed and provisioned before or after being arranged, routed, and packaged together with other integrated circuit devices to form a system or product. For instance, one or more NVM devices and other device types may be arranged, bonded, routed, and packaged on a printed circuit board in a packaged system device. It is noted that the terms nonvolatile programmable device and nonvolatile memory device are used interchangeably herein.

Certain embodiments described herein provide techniques and systems for securely detecting degradation of product quality in a memory device before device failure. In one embodiment, an integrated circuit (IC) includes a memory device having a memory array and a crypto subsystem for implementing encryption and decryption. The IC may also include a master controller unit (MCU) or processor that may serve as part of a bridge driver system for interfacing between a remote server and the memory device. Alternatively, the MCU and memory device may be separately packaged IC devices, mounted and communicatively coupled together on a printed circuit board, by way of example.

The MCU and other bridge driver components can be generally configured to facilitate secure connection with the remote server in cooperation with the memory device's crypto subsystem by transmission of encrypted test commands, test code data, and test results data between a remote secure server and the memory device. Encrypted test code data can be received from the remote server and decrypted by the memory device's crypto subsystem. Test results, regarding the health of the memory cells of the memory array, can also be encrypted by the crypto subsystem and then sent back to the remote server, e.g., via the MCU. Test code, test program, diagnostics, and diagnostics program are used herein interchangeably. Additionally, test results, test results data, diagnostics data, diagnostics results, and diagnostics results data are used interchangeably.

Figure 2:
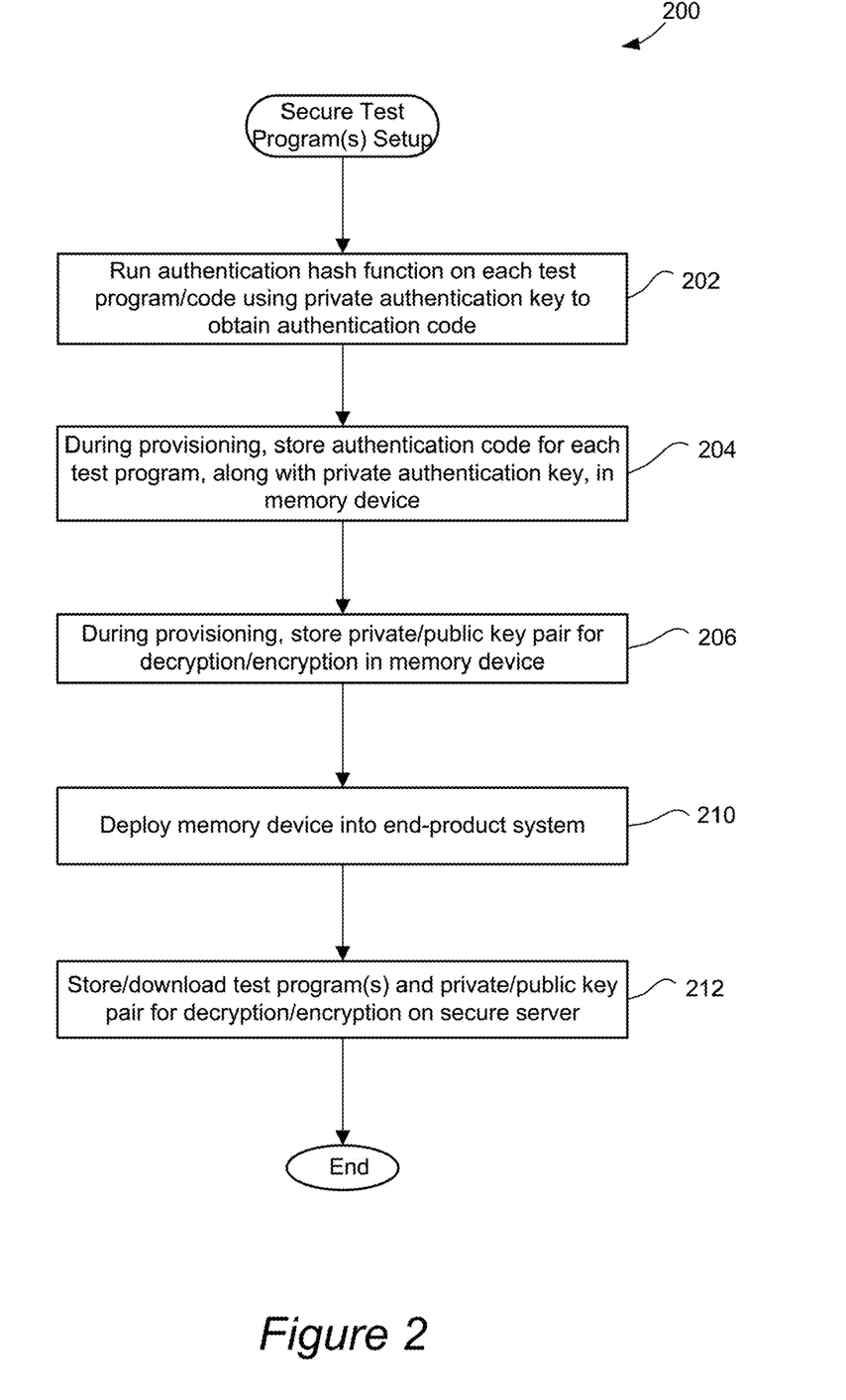
FIG. 2 is a flow chart illustrating a process for setting up a diagnostic program for remote implementation with respect to a memory device in accordance with one embodiment of the present disclosure.

This design allows a memory device's memory array to be assessed and diagnosed without being removed from the end-product system or the like. That is, diagnostics can be performed on the memory device by connecting remotely to access test result data from the memory array while the memory device remains in the end-product system. Memory degradation can be detected early and mitigated before failure of the memory device. Thus, end user reliability of storage components can be increased. by taking corrective actions prior to failure FIG. 2 is a flow chart illustrating a process 200 for setting up a test program for secure and remote implementation with respect to a memory device in accordance with one embodiment of the present disclosure. The following setup process may be implemented with any suitable type and number of test programs for performing diagnostics on a memory array or otherwise assessing the function and health of such array. Additionally, this process may be implemented with respect to multiple memory devices.

Initially, an authentication hash function may be run on each test program using a private authentication key to obtain an authentication code in operation 202. Any suitable message authentication code may be obtained in any suitable manner. For example, a hashed message authentication code (HMAC) may be implemented on each test program. By way of examples, any cryptographic hash function, such as SHA-256 or SHA-3, may be used in the calculation of an HMAC. HMAC uses two passes of hash computation. The authentication key is first used to derive two keys—inner and outer. The first pass of the algorithm produces an internal hash derived from the test program and the inner key. The second pass produces the final HMAC code derived from the internal hash result and the outer key.

During provisioning, the authentication code calculated for each test program, along with the private authentication key, can be provided and stored in the memory device in operation 204. For example, a master MCU of the memory device IC may be programmed to provision the memory device upon startup. In another example, the memory device is programmed by the memory vendor. The authentication key can be later used by the memory device to hash the test program again, and if it is authentic, the stored hash (e.g., from operation 204) and computed hash (e.g., from operation 504) will match. The authentication may be performed on the encrypted or decrypted test program.

During provisioning, a private/public key pair for decryption/encryption may also be stored in the memory device in operation 206. The private key may be used to later decrypt each test program received and authenticated in the memory device, while the memory device uses the public key to encrypt test results prior to sending back to a remote server. During this provisioning, the memory device vendor can optionally decide which test codes can be used with the memory device by provisioning selected authentication codes for the desired test codes into the memory device.

After provisioning is complete, the memory device may then be deployed into the end-product system in operation 210. For example, the memory device IC may be integrated into a subsystem, such as a printed circuit board for a particular control module and/or the final system, such as the automobile system. The memory device may form part of an IC system, which further includes a processor, such as a CPU or MCU, for accessing data from the memory device's memory array via a control bus by way of example.

The one or more test programs and private/public key pair for decryption/encryption may also be stored (or downloaded later) onto a secure server in operation 212. The secure server may also be configured to implement various functions for securely communicating with the memory device as further described herein. In generally, the secure server may reside at the system site (e.g., auto factory) or a trusted $3^{rd}$ party site. The process 200 may then end (or be repeated for other memory devices).

Figure 3:
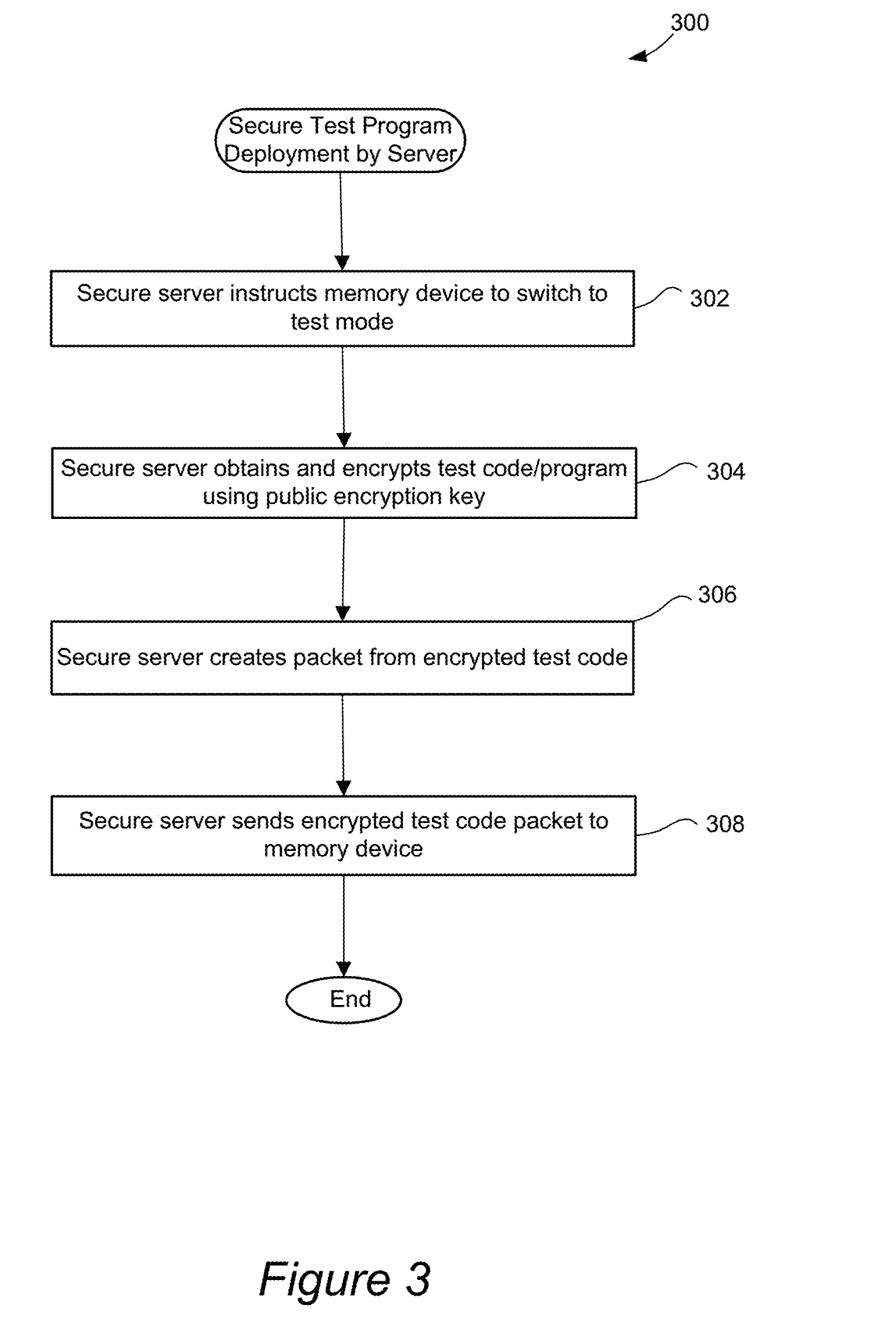
FIG. 3 is a flow chart illustrating a process for secure diagnostic program deployment by a remote server in accordance with a specific embodiment of the present disclosure.
Figure 4:
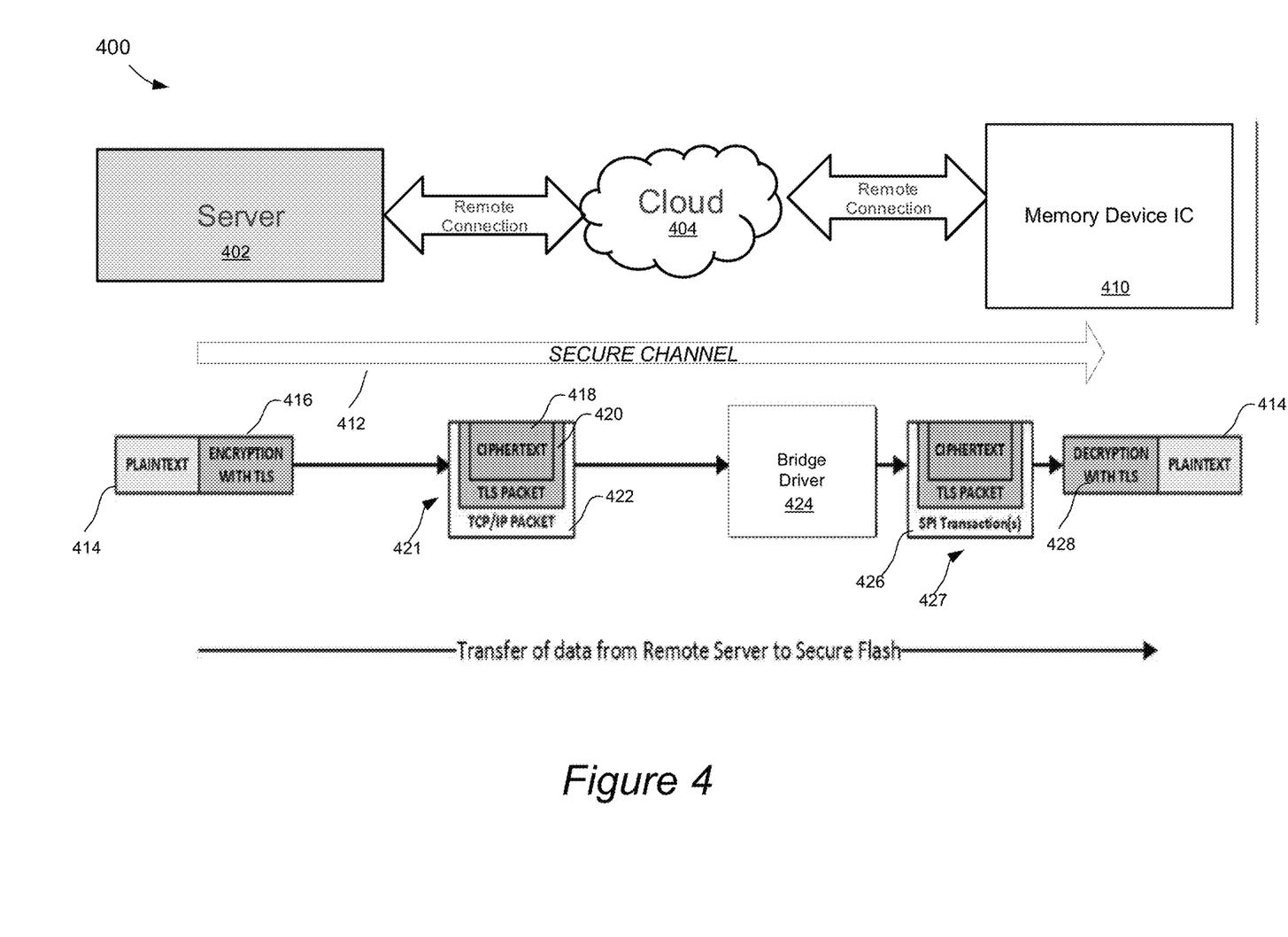
FIG. 4 is a diagrammatic representation of diagnostic code deployment in accordance with one example of the present disclosure.

FIG. 3 is a flow chart illustrating a process 300 for secure test program deployment by a remote server in accordance with a specific embodiment of the present disclosure. FIG. 4 is a diagrammatic representation of such deployment in accordance with one example of the present disclosure. FIGS. 3 and 4 will be described together. Although this illustrated example shows deployment of an encrypted test program by a remote server to a memory device, the test code may alternatively be provisioned in the memory device. In this alternative example, the remote server can later initiate execution of the memory device's previously deployed test code and then await receipt of encrypted test results from the memory device.

In the illustrated deployment example of FIGS. 3 and 4, a secure server (e.g., 402) may initially instruct a memory device to switch to a test mode (from a user mode) in operation 302. This instruction may be communicated between the secure server 402 and a memory device IC 410 via a remote connection through a cloud network 404 of bridge driver components as illustrated in FIG. 4. Each illustrated communication operation between the remote server and the memory device in this process 300 (as well as other processes described herein) may include any number of interactions therebetween. That is, the remote server may issue a command to put the memory device in test mode, while the memory device sends a reply when the test mode has commenced.

At any suitable time, the secure server may obtain and encrypt test code using its public encryption key (for which the memory device has the corresponding private encryption key) in operation 304. The unencrypted test code may be securely provided by a website or approved $3^{rd}$ party website of the memory device (e.g., 410) manufacturer to a server (e.g., 402) controlled by an approved OEM system entity (e.g., automobile company or trusted $3^{rd}$ party facility). Alternatively, the encrypted test code may be provided to the server, which no longer performs encryption for the test code. The test code may be obtained as needed during this process 300 as illustrated or prior to this process 300.

In the illustrated example, symmetric encryption is implemented although other encryption methods are contemplated in different scopes of the present disclosure. As shown in FIG. 4, test code 414 is encrypted with a TLS (transport layer security) protocol, e.g., 416, to result in encrypted test code or "ciphertext" 418 and appended TLS header 420. The secure server 402 (or another bridge component) may then create a packet from the encrypted test code in operation 306. For example, a secure memory interface header for communicating with the memory device 410 and an TCP/IP header is added to the test code packet. As shown, the encrypted test code 418 includes TLS header 420 and TCP/IP header 422 to form the encrypted test code packet 421.

The TLS memory header may generally include any suitable number and type of TLS memory commands and parameters. The memory device is configured to perform various tasks based on the memory header (e.g., TLS header). For instance, the memory header may instruct the memory device to go into test mode and await receipt of test code or indicate that the packet's payload contains encrypted test code. The following Table 1 provides various TLS memory commands for various diagnostic tests by way of examples.

TABLE 1

Diagnostics Test Examples

| # | Diagnostic Test | Parameters | Use Case |
|---|---|---|---|
| 1 | Read out GCN/LCN | GCN/LCN | Read out GCN/LCN to ensure product aging is within spec |
| 2 | Program CKBD Pattern | Page PGM pulse count | Check for abnormal PGM pulse count |
|   |   | Page Program time Vt10max Vt01min | Check for abnormal PGM time |
| 3 | Read | Read known CKBD pattern w/ different Vg | Check Read path marginality |
| 4 | Split Erase - PrePGM | PrePGM pulse count | Check for abnormal PrePGM pulse count |
|   |   | PrePGM time Vt00min | Check for abnormal PrePGM time |
|   |   | Vt00max | Check for "00" width |
| 5 | Split Erase - Erase | Erase pulse count | Check for abnormal Erase pulse count |
|   |   | Erase time Vt11max | Check for abnormal Erase time |
| 6 | Split Erase - SPGM | SPGM time Vt11max Vt11min | Check for abnormal SPGM time Check for SPGM overshoot Check for SPGM compaction |
| 7 | Split Erase - DREF/DCOL Program | DREF/DCOL PGM time DREF Vt01min DREF Vt10max | Check for abnormal DREF/DCOL time |
| 8 | Read existing data | ECC OFF / ON Read Vt10max Vt01min | Report # of pages in which ECC OFF ≠ ECC ON |
| 9 | Scan Chain Test | Logic test | Run Scan Chain test to check logic circuit health |
| 10 | Gross Iref Measure | Iref current | Check reference cell values |

The following acronyms are used above: GCN/LCN (Global cycle counter/Local cycle counter), PGM (Program), Vt10max (Maximum threshold voltage of "10" stage), Vt01min (Minimum threshold voltage of "01" stage), CKBD (checkerboard), Vg (gate voltage), PrePGM (Pre-Program), Vt00 min (Min. threshold voltage of "00" stage), Vt00max (Maximum threshold voltage of "00" stage), Vt11max (Maximum threshold voltage of "11" stage), Vt11min (Min. threshold voltage of "11" stage), SPGM (SoftProgram), DREF/DCOL (Dynamic Reference/Dummy column), ECC (Error Correction Code), Iref (Current Reference).

Referring back to FIG. 3, the secure server 402 may then send the encrypted test code packet 421 to the memory device in operation 308. The server may also invoke execution of such test code once the test code is decrypted and resident in the memory device. For instance, the memory device 410 may indicate this residence status to the server in a previously received reply packet. As shown by way of example in FIG. 4, the encrypted test code packet 421 is received by the bridge driver 424 and sent to the memory device IC 410. The bridge driver 424 can include any number and type of switches, routers, cloud network devices, and controller devices (e.g., MCU/CPU, bus controller, memory controllers, etc.). The bridge driver components may form part of cloud network 404 and/or memory device IC 410. Any suitable component of the bridge driver 424, such as an MCU, may also be configured to remove the TCP/IP header 422 and add a bus protocol header, such as an SPI transactions header 426, to form encrypted test code packet 427. As further described below, the encrypted test code packet 427 is then generally received by the memory device 410 and decrypted (e.g., via decryption with TLS 428) to obtain the underlying decrypted payload 414. The test code deployment to the memory device 410 then ends while the remote server 402 awaits the test results.

The bridge driver 424 (and server) may utilize any suitable communication protocol for facilitating commands between the memory device and server for providing the memory device with a test program/code. For flash/EEPROM/MCU memory, the Serial Peripheral Interface (SPI) protocol may be utilized to push (or receive) data over an SPI bus coupled with the memory device 410. In a more specific example, the SPI bus of the memory device may use a quad IO configuration that includes the following signals/pins for each memory device: 1 chip select pin (CS) for enabling each device, 4 half-duplexed serial input/output pins (IO0, IO1, IO2, IO3) for serial data/address/command input and output, and 1 clock pin (CK). The CK signal may be used to specify four different modes with respect to the IO signals (command, program, read, etc.) based on four different combinations of polarity and phase values. Different modes, such as test mode, may also be specified in specific cycles of the IO signals. Of course, the memory device (and server) may utilize for communication other pin configurations, such as 3-wire or 4-wire configuration, although not as efficient as a quad IO configuration.

Figure 5:
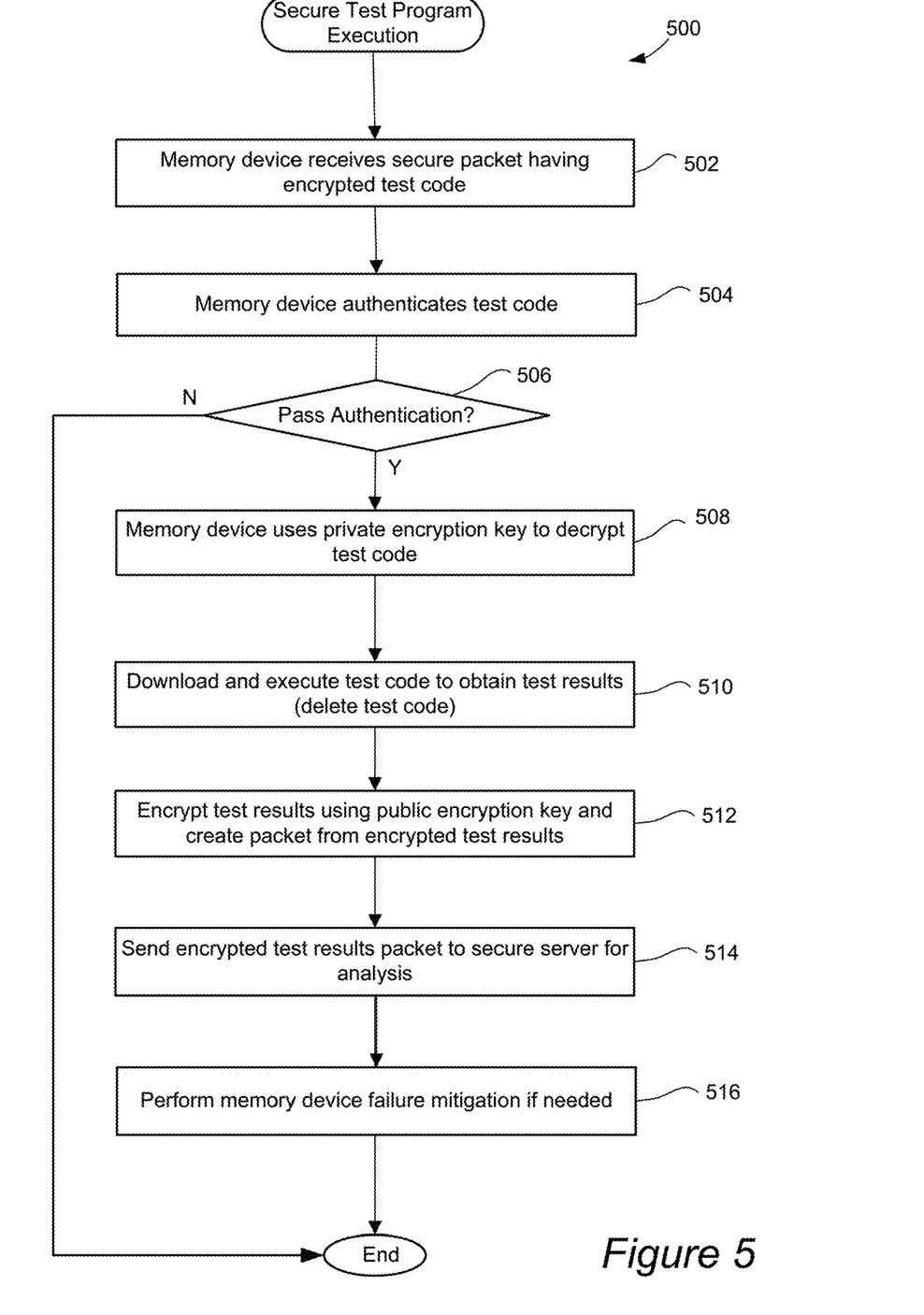
FIG. 5 is a flow chart illustrating a process for securely executing a diagnostic program received from a remote server in accordance with one embodiment of the present disclosure.

FIG. 5 is a flow chart illustrating a process 500 for securely executing a test program received from a remote server in accordance with one embodiment of the present disclosure. Initially, a memory device may receive a secure packet having encrypted test code in operation 502. After removal of the headers, the encrypted test code may be temporarily stored in RAM prior to authentication and downloading of the test code into the memory device's memory array.

The memory device may authenticate the test code in operation 504 in any suitable manner. For instance, the memory device uses a previously provisioned private authentication key and HMAC function on the received test code to obtain a computed authentication code, which is then compared to the previously provisioned authentication code. The authentication process is preferably performed on the encrypted test code prior to decryption but can also be performed after the test code is decrypted. In the later example, the authentication code was previously obtained and provisioned to the memory device based on the unencrypted test code.

It may then be determined whether the test code has passed authentication in operation 506. For instance, it is determined whether the computed and provisioned authentication codes match. If one or more bits are off in the received test code, the authentication codes will not match and authentication for the received "test code" will fail. If the test code fails authentication, the deployment process 500 may end.

If authentication passes in operation 506, the memory device may then use the private encryption key, which was previously provisioned and stored in its memory device, to decrypt the received test code in operation 508. The decrypted test code may then be downloaded and executed on the memory device's array cells to obtain test results in operation 510. The received encrypted test code may be stored in internal SRAM of memory device. The decrypted test code may also be stored in and executed from internal SRAM of memory device. After execution, the test code can then be deleted from the memory device. The server may instruct the memory device to remove the test code after receipt of test results.

It is noted that authentication may be performed between the server and memory device prior to commencing any further communication, e.g., setting up a test code transmission. For instance, it may be determined whether the communication has been initiated using an "https" secure connection.

In some embodiments, the remote server 402 may also send individual encrypted test code portions that are each sized to be received in chunks by the memory device's input pins. The memory device can wait to collect enough encrypted test portions to fill the corresponding target page of its memory target. For example, test code portions can be transferred in 16 bytes (via 4 IO pins) at a time. The memory device may be configured to wait until 16 chunks of 16-byte test code portions are received and collected prior to authenticating and storing all 256 bytes of test code together starting at the target address. A portion of the memory (or other onboard RAM memory) may be used to temporarily store multiple chunks of received test code until the size of received test code chunks corresponds to the target address or page size. Alternatively, each encrypted test code chunk can be decrypted and temporarily stored until enough decrypted chunks are collected to then be written into the target address. If there is enough memory, the entire decrypted or encrypted test code may be collected prior to decrypting or storing, respectively, the entire decrypted or encrypted test code, respectively. For example, the received encrypted test code chunks may be stored in internal SRAM of memory device. The decrypted test code may also be stored in and executed in the same internal SRAM of memory device.

Figure 6:
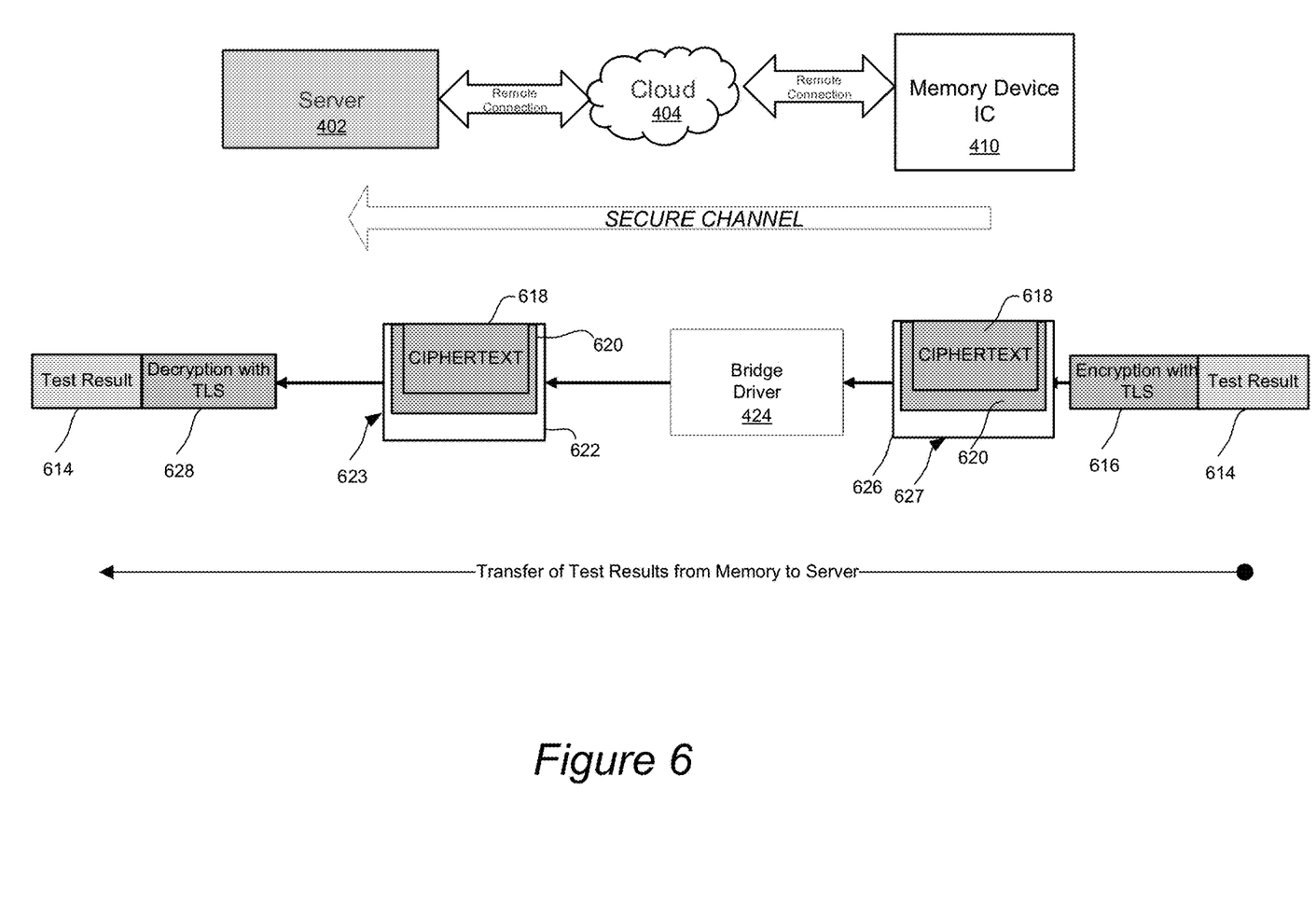
FIG. 6 is a diagrammatic representation of secure diagnostic results deployment in accordance with one example of the present disclosure.

FIG. 6 is a diagrammatic representation of secure test results deployment in accordance with one example of the present disclosure. After the test code is executed, the test results 614 may then be encrypted using the public encryption key, which was previously provisioned in the memory device, and a packet created from the encrypted test results in operation 514. For instance, encryption with TLS (transport layer security) protocol 616 is implemented on the test results 614 to produce encrypted test results packet 627 having an encrypted payload 618, TLS header 620, and bus protocol header 626 (e.g., such as SPI). The test results deployment with respect to the memory device ends. The test results may also be deleted from the memory device.

The encrypted test results packet 627 is received by bridge driver 424, which replaces the bus protocol header 626 with a TCP/IP header 622, and forwards the resulting packet 623 to the secure server 402, which performs decryption 628 (e.g., with TLS) to obtain the decrypted test results 614. It is noted that the encrypted packet passes through the bridge driver components without decryption of the packet's payload by any bridge components. In one example, the test results may originate from the "Read out GCN/LCN" Diagnostic Test (listed in Table 1 above), which includes reading of GCN/LCN from a selected sector and checking to ensure if the memory cells are aging within specification.

Figure 7:
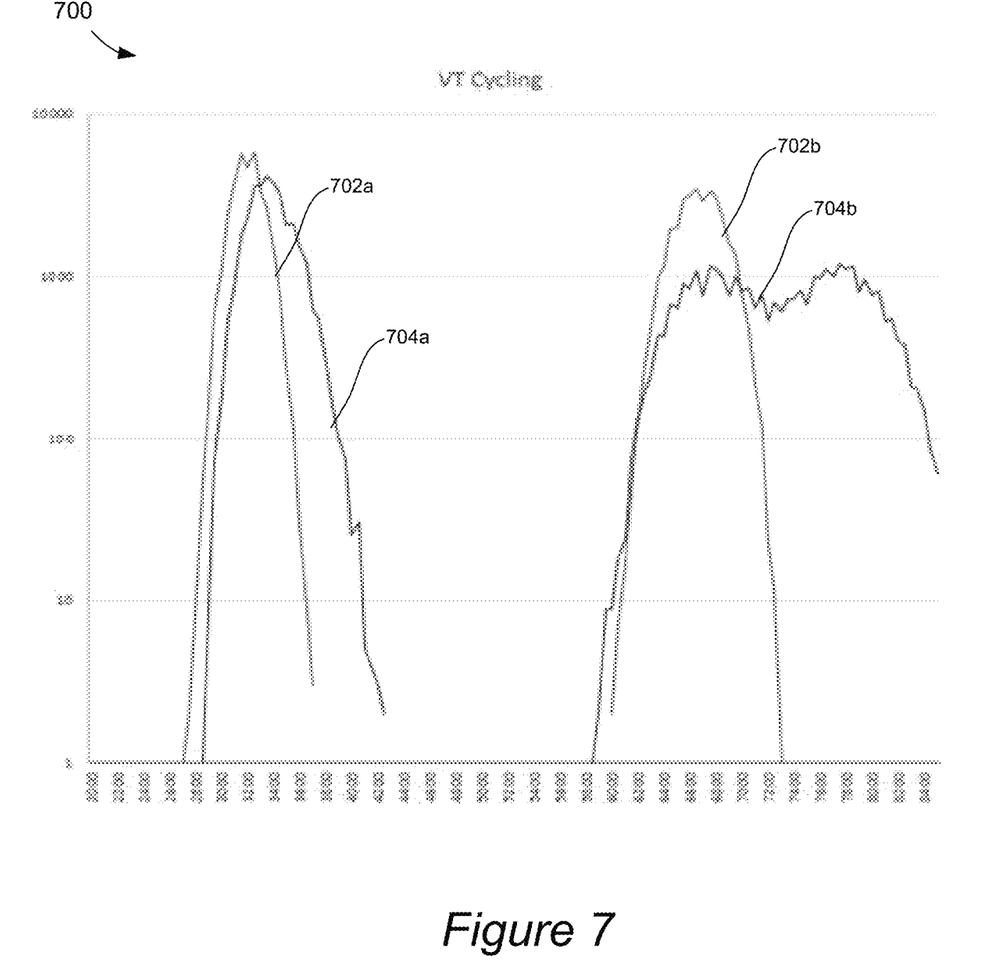
FIG. 7 illustrates example diagnostic results from execution of a diagnostic program on a memory device.

The secure server 402 may analyze the test results in any suitable manner to assess the health of the memory device. The test results analysis can occur in a secure environment and generally provides an indication of the health of the memory array. FIG. 7 illustrates example test results data from execution of a test program on a memory device. As shown, the test result data is plotted in a $V_T$ distribution graph having an x axis for threshold voltage and a y axis for number of cycling. This data includes two sets of graphs for data 702a and 702b indicating healthy memory, as compared to data 704a and 704b indicating unhealthy memory.

Referring back to FIG. 5, mitigation of potential memory device failure may be performed based on analysis of the test results if needed and feasible in operation 516, and the process 500 ends. For example, the memory array can be recalibrated by the server or vendor to have a lower bit failure rate. Recalibration can be performed by the same test code. For example, the "Program CKBD pattern" Diagnostic Test listed in Table 1 above can be used to test a Page PGM pulse count for a selected page A. If the result shows an abnormal PGM pulse count, this same Diagnostic Test can then be executed on selected page B for calibrating page A. After performing appropriate mitigation steps, the end-product system can continue running with the same recalibrated memory device. In other examples, the entire PCB (or memory device IC) can be replaced before failure.

Figure 8:
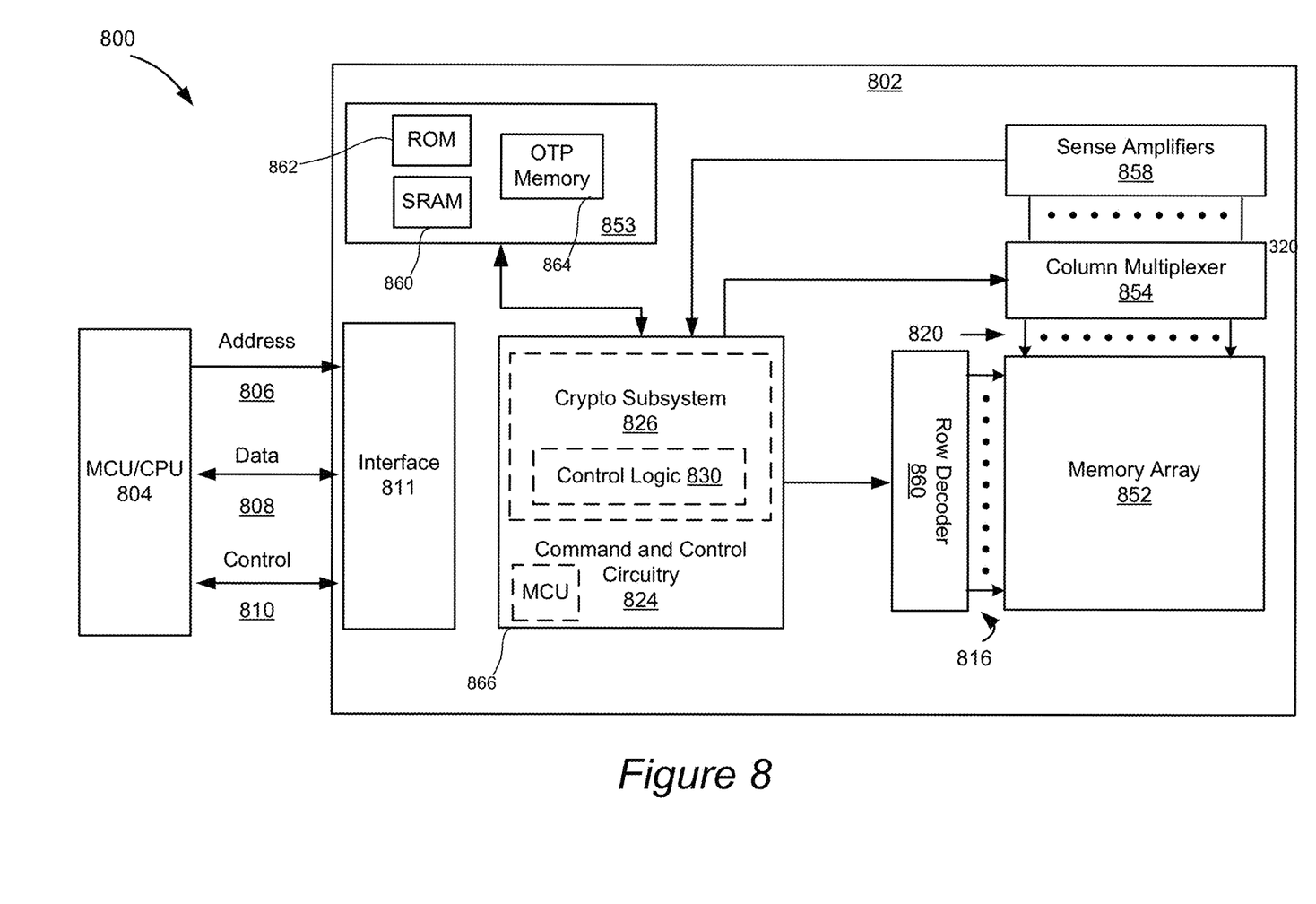
FIG. 8 illustrates a block diagram of a processing system including an memory device, implemented in accordance with some embodiments.

FIG. 8 illustrates a block diagram of a processing system 800 including memory device 802, implemented in accordance with some embodiments. Processing system 800 generally includes non-volatile memory device 802 coupled to processor 804 in a conventional manner via address bus 806, data bus 808, and control bus 810. It will be appreciated by those skilled in the art that the processing system 800 of FIG. 8 has been simplified for the purpose of illustrating the present disclosure and is not intended to be a complete description.

In various embodiments, processing system 800 may include processor 804 which may be a type of general purpose or special purpose processing device. For example, in one embodiment the processor can be a processor in a programmable system or controller that further includes a memory device, such as a Programmable System On a Chip or PSoC™ controller, commercially available from Cypress Semiconductor of San Jose, Calif.

Memory device 802 may include memory array 852. Accordingly, memory array 852 may be organized as rows and columns of non-volatile memory cells (not shown in this figure). In embodiments, non-volatile memory cells may include but not limited to flash memory cells, F-RAM, M-RAM, R-RAM, EEPROM, SONOS cells. Memory array 852 is coupled to row decoder 860 via multiple select lines and read lines 816 (at least one select line and one read line for each row of the memory array). Memory array 852 is further coupled to column multiplexer 854 via multiple bit lines 820. It will be appreciated that common source lines may be implemented as part of lines 820 or lines 816. Memory array 852 may be coupled to a plurality of sense amplifiers 858 to read multi-bit words therefrom.

The memory device 802 may also include additional storage 853, such as ROM 862 for storing and execution of firmware, SRAM 860 for storing and execution of firmware, storing of decrypted test code, storing and execution of decrypted test code, etc. The additional storage may also comprise a one-time programmable (OTP) memory system 864 for storing authentication codes, authentication keys, public and private encryption keys, etc. In one example, the OTP memory system 864 may include specialized circuitry that is arranged to allow corresponding memory to be programmed only once and thereafter inhibits programming. The additional storage may also comprise nonvolatile memory for storing authentication codes, authenticated keys and private key, etc. After provisioning, the nonvolatile memory may then be set to be used as OTP memory 864.

Memory device 802 may further include command and control circuitry 824 to control row decoder 860, column multiplexer 854, and sense amplifiers 858, and to receive read data from sense amplifiers 858, as well as to generate the voltages needed for operation of memory array 852, which may be routed to row decoder 860 and column multiplexer 854.

In various embodiments, control circuitry 824 may include one or more processors (e.g., MCU 866) and dedicated memory that may be configured to implement some of the previously described techniques, as well as execution of firmware in ROM 862 and SRAM 860, as well as execution of test code in SRAM 860. In this way, system 800 may utilize a dedicated processing unit, such as control circuitry 824, which may be configured to implement the previously described processes in conjunction with execution of code in additional storage 853. Moreover, in some embodiments, control circuitry 824 may be implemented in an application specific integrated circuit (ASIC), or may be implemented in reprogrammable logic of a field programmable gate array.

Command and control circuitry 824 may also include crypto subsystem 826 for performing decryption on received encrypted packets based on a provisioned private key as described above. Additionally, crypto subsystem 826 is configured to encrypt test results based on a provisioned public key as described above. Accordingly, crypto subsystem 826 may include control logic, such as control logic 830.

In specific embodiments, command and control circuitry 824 may be further configured to control row decoder 860 to select a first row of memory array 852 for a program operation by applying a voltage to a first select line in the first row and to deselect a second row of the memory array by applying another voltage to a second select line in the second row. Command and control circuitry 824 may be further configured to control column multiplexer 854 to select a memory cell in the first row for programming by applying a voltage to a first bit line in a first column, and to inhibit an unselected memory cell in the first row from programming by applying another voltage to a second bit line in a second column. Row decoder 860 or column multiplexer 854 may be further configured to apply a voltage to one or more common source lines that may be coupled to memory cells included in memory array 852.

In various embodiments, communications interface 811 may be configured to send and receive data to other system components or may be configured to send and receive packets or data packets over a network. For example, communications interface 811 may be communicatively coupled to a user interface device via a bus or a communications network. Communications interface 811 may be configured to receive data from a user interface device which may be included in a data processing system or computer system 804. In various embodiments, such data may include an input identifying wear leveling parameters. In various embodiments, communications interface 811 may be a device that supports Ethernet interfaces, frame relay interfaces, cable interfaces, and DSL interfaces. In addition, various very high-speed interfaces may be provided such as fast Ethernet interfaces, Gigabit Ethernet interfaces, HSSI interfaces, POS interfaces, FDDI interfaces and the like. Generally, these interfaces may include ports appropriate for communication with the appropriate media. In some cases, they may also include an independent processor and, in some instances, volatile such as some type of RAM.

Figure 9:
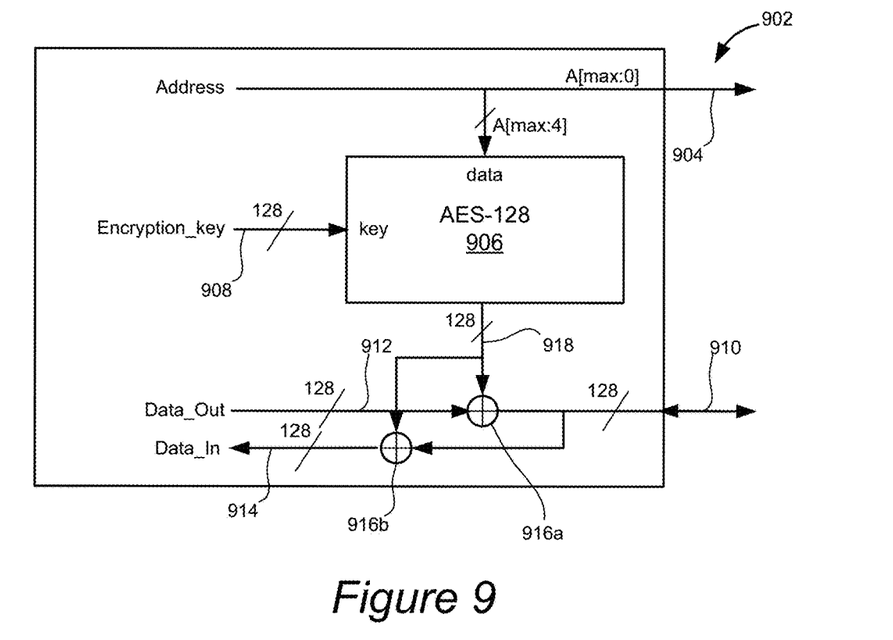
FIG. 9 is a diagrammatic representation of a crypto system in accordance with one embodiment of the present disclosure.

The crypto subsystem 826 may be implemented in any suitable combination of hardware and/or software. FIG. 9 is a diagrammatic representation of a crypto system 902 in accordance with one embodiment of the present disclosure. As shown, the encryption circuitry may include an Advanced Encryption Standard (AES) block 906 for performing one or more decryption algorithm(s) on test code portion received serially on 4 address lines 904 based on private encryption key 908. In this example, a streaming cipher is implemented to minimize latencies although other types may be used. The test code data may be input on selected address lines 904 in 16-byte chunks. Of course, any suitable input pins of the memory device 802 may be utilized for inputting test code data to be decrypted. In this example, the key has a 128-bit length although other lengths can be used. In this implementation, blocks are transferred on 16-byte boundaries. For instance, programming 1 byte of data may require 16 bytes of storage without allowing incremental programming or overwriting.

Encrypted data may be correspondingly output in 16-byte chunks via data output lines 910, for example, to a non-volatile memory (NVM) array. The encryption circuitry 902 may also include multi-bit XOR gates 916a and 916b that can be driven with 0's by the AES block 906 when data is to be transferred in an unencrypted manner.

Figure 10:
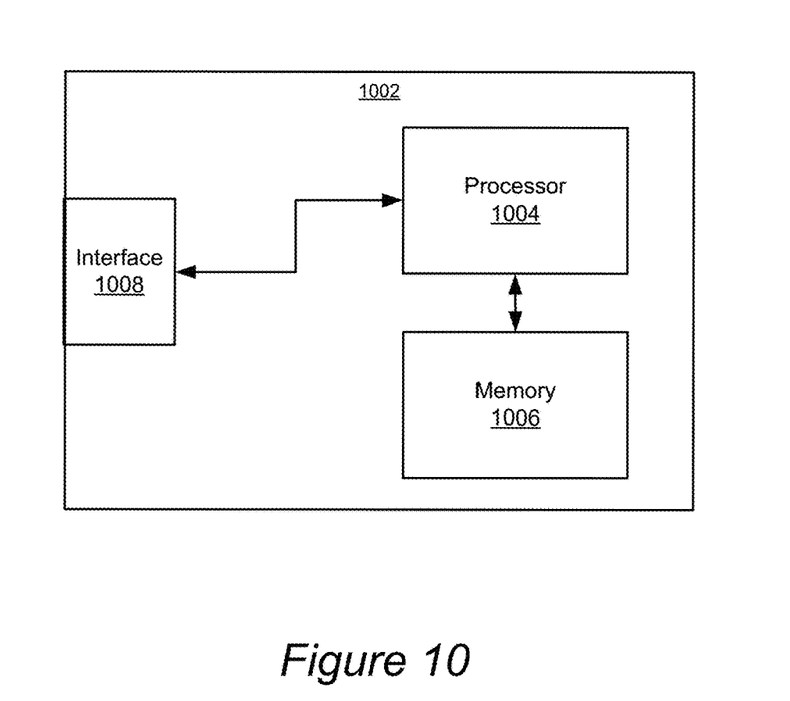
FIG. 10 is a diagrammatic representation of a server system in accordance with one embodiment of the present disclosure.

FIG. 10 is a diagrammatic representation of a server system 1002. As shown, the server system may include a processor 1004, storage system 1006, and interface 1008. The processor 1002 and memory 1004, which includes machine readable storage media, may be configured to implement in coordination any of the server methods or operations as described further above. Various specially configured devices can also be used in place of a processor 1002 or in addition to processor 1002. The interface 1008 is typically configured to send and receive data packets over a network. The components of server 1002 may also communicate with each other and external device via a bus (e.g., a PCI bus or other interconnection fabric)

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. Although a particular server is described, it should be recognized that a variety of alternative configurations are possible.

Because such information and program instructions may be employed to implement the systems/methods described herein, the present disclosure relates to machine readable storage media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher level code that may be executed by the computer using an interpreter.

Although the foregoing disclosure has been described in some detail for purposes of clarity of understanding, it will be apparent that certain changes and modifications may be practiced within the scope of the appended claims. It should be noted that there are many alternative ways of implementing the processes, systems, and apparatus of the present invention. Accordingly, the present embodiments are to be considered as illustrative and not restrictive, and the invention is not to be limited to the details given herein.

What is claimed is:

1. A system, comprising:
   a memory device comprising a memory array having a plurality of memory cells and a crypto subsystem for performing encryption and decryption of diagnostic data; and
   a processor coupled with the memory array and crypto subsystem, wherein either a same integrated circuit (IC) device comprises the processor and the memory device or the processor is a separate IC device mounted on a same printed circuit board as the memory device, the processor being configured to receive encrypted diagnostic data from the crypto subsystem and communicate such encrypted diagnostic data to a remote server while the IC is embedded in an end-user system, wherein the encrypted diagnostic data pertains to the health of the memory cells of the memory array, wherein the encrypted diagnostic data is received and communicated to the remote server after receiving at the system a test mode command for instructing the memory device to switch to test mode prior to receiving an encrypted diagnostics program at the system.

2. The system of claim 1, wherein the processor is further configured to:
   receive the encrypted diagnostic program from the remote server, wherein a TCP/IP (transport control protocol/internet protocol) header is appended to the received encrypted diagnostics program,
   communicate the encrypted diagnostic program to the crypto subsystem for decryption into a decrypted diagnostic program, and wherein the TCP/IP header is replaced with a bus protocol header prior to being communicated to the crypto subsystem, and
   execute the decrypted diagnostic program on the memory array to generate diagnostic data that is communicated to the crypto subsystem for encryption into the encrypted diagnostic data.

3. The system of claim 2, further comprising additional memory for storing an authentication code for the encrypted or decrypted diagnostic program, wherein the processor is further configured to perform an authentication operation on the encrypted or decrypted diagnostic program using the authentication code and executing the decrypted diagnostic program only when authentication passes.

4. The system of claim 3, wherein the additional memory is also configured to store an authentication key, wherein the authentication operation comprises a hashed message authentication code (HMAC) performed on the encrypted or decrypted diagnostic program and further based on the authentication key.

5. The system of claim 2, further comprising a one-time programmable memory system for storing a private encryption key, wherein the decryption of the encrypted diagnostic program is based on the private encryption key, wherein the decrypted diagnostic program was encrypted by the remote server into the encrypted diagnostic program using a public encryption key paired with such private encryption key.

6. The system of claim 1, wherein the memory array comprises nonvolatile memory.

7. The system of claim 1, wherein:
   the received encrypted diagnostic data is appended with a secure protocol header that is appended with a bus protocol header,
   the processor is further configured to replace the bus protocol header with a TCP/IP (transport control protocol/internet protocol) header, and
   the encrypted diagnostic data that is communicated to the remote server is appended with the secure protocol header that is appended with the TCP/IP header.

8. A method of diagnosing the health of a memory device, the method comprising:
   from a remote server, initiating diagnostics via an encrypted channel on the memory device embedded in an end-use system, wherein the memory device includes a plurality of memory cells in a memory array, wherein the initiating diagnostics comprises:
   by the remote server, sending a test mode command for instructing the memory device to switch to test mode prior to sending an encrypted diagnostics program to the memory device, and
   appending a TCP/IP (transport control protocol/internet protocol) header to the encrypted diagnostics program prior to sending it to the memory device, wherein the TCP/IP header is replaced with a bus protocol header by a bridge driver device prior to being received by the memory device: and
   at the remote server, receiving encrypted diagnostics data in response to execution of the diagnostics program by the memory device on the plurality of memory cells, wherein the diagnostics data pertains to the health of the plurality of memory cells, wherein the encrypted diagnostics data is appended with a secure protocol header that is appended with a TCP/IP header with which the bridge driver device, coupled with the memory device, has replaced a bus protocol header prior to sending such encrypted diagnostic data to the remote server.

9. The method of claim 8, further comprising:
- decrypting the encrypted diagnostics data into decrypted diagnostics data; and
- analyzing the decrypted diagnostics data to determine the health of the memory cells.

10. The method of claim 9, further comprising:
- performing failure mitigation for the memory device if the analyzing indicates unhealthy memory cells.

11. The method of claim 8, wherein an authentication function is performed on the decrypted or encrypted diagnostic program by the memory device prior to execution, wherein the authentication function is a hashed message authentication code (HMAC).

12. The method of claim 8, wherein initiating diagnostics comprises:
- from the remote server, sending an encrypted diagnostics program to the memory device, which is configured to decrypt such encrypted diagnostics program prior to execution of the decrypted diagnostics program.

13. The method of claim 12, wherein encryption of the encrypted diagnostics program was performed by the remote server prior to sending to the memory device.

14. The method of claim 12, wherein encryption of the encrypted diagnostics program is based on a public encryption key that is paired with a private encryption key provisioned at the memory device for decrypting the encrypted diagnostics program received by the memory device.

15. The method of claim 8, wherein the test mode command is appended with a secure protocol header that is implemented by the memory device, the secure protocol of the test mode command and the encrypted diagnostics data each being a Transport Layer Secure (TLS) protocol.

16. At least one non-transitory computer readable storage medium having computer program instructions stored thereon that are arranged to perform the following operations:
- from a remote server, initiating diagnostics via an encrypted channel on a memory device embedded in an end-use system, wherein the initiating diagnostics comprises:
  - by the remote server, sending a test mode command for instructing the memory device to switch to test mode prior to sending an encrypted diagnostics program to the memory device, and
  - appending a TCP/IP (transport control protocol/internet protocol) header to the encrypted diagnostics program prior to sending it to the memory device, wherein the TCP/IP header is replaced with a bus protocol header by a bridge driver device prior to being received by the memory device: and
- at the remote server, receiving encrypted diagnostics data in response to execution of the diagnostics program by the memory device on a plurality of memory cells in an array of the memory device, wherein the diagnostics data pertains to the health of the plurality of memory cells, wherein the encrypted diagnostics data is appended with a secure protocol header that is appended with a TCP/IP header with which the bridge driver device replaced a bus protocol header prior to sending such encrypted diagnostic data to the remote server.

17. The at least one non-transitory computer readable storage medium of claim 16, wherein the computer program instructions are further arranged for:
- decrypting the encrypted diagnostics data into decrypted diagnostics data; and
- analyzing the decrypted diagnostics data to determine the health of the plurality of memory cells.

18. The at least one non-transitory computer readable storage medium of claim 16, wherein the computer program instructions are further arranged for:
- performing failure mitigation for the memory device if the analyzing indicates unhealthy memory cells.

19. The at least one non-transitory computer readable storage medium of claim 16, wherein an authentication function is performed on the decrypted or encrypted diagnostic program by the memory device, wherein the authentication function is a hashed message authentication code (HMAC).

20. The at least one non-transitory computer readable storage medium of claim 16, wherein initiating diagnostics comprises:
- from the remote server, sending an encrypted diagnostics program to the memory device, which is configured to decrypt such encrypted diagnostics program prior to execution of the diagnostics program.

21. The at least one non-transitory computer readable storage medium of claim 20, wherein encryption of the encrypted diagnostics program is based on a public encryption key that is paired with a private encryption key provisioned at the memory device for decrypting the encrypted diagnostics program received by the memory device.

* * * * *